(12) United States Patent
Lacaze et al.

(10) Patent No.: US 11,397,438 B2
(45) Date of Patent: Jul. 26, 2022

(54) DRIVER AID AND AUTONOMOUS TRACTOR-TRAILER PARKING AND LOADING DOCK ALIGNMENT SYSTEM

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 206 days.

(21) Appl. No.: 16/678,244

(22) Filed: Nov. 8, 2019

(65) Prior Publication Data

US 2021/0141384 A1 May 13, 2021

Related U.S. Application Data

(60) Provisional application No. 62/768,473, filed on Nov. 16, 2018.

(51) Int. Cl.
*G05D 1/02* (2020.01)
*G05D 1/00* (2006.01)
*B62D 13/06* (2006.01)
*G06V 20/58* (2022.01)

(52) U.S. Cl.
CPC .......... *G05D 1/0225* (2013.01); *B62D 13/06* (2013.01); *G05D 1/0088* (2013.01); *G05D 1/0223* (2013.01); *G06V 20/586* (2022.01); *G05D 2201/0213* (2013.01); *G06T 2207/10028* (2013.01)

(58) Field of Classification Search
CPC ... G05D 1/0225; B62D 13/06; B62D 15/0285
See application file for complete search history.

(56) References Cited

U.S. PATENT DOCUMENTS

| | | | |
|---|---|---|---|
| 9,821,808 B1 * | 11/2017 | Abbas | G01C 21/3461 |
| 2014/0283398 A1 * | 9/2014 | Galyean | B65G 69/2882 33/228 |
| 2016/0176663 A1 * | 6/2016 | Hecky | B65G 63/004 701/23 |
| 2018/0157270 A1 * | 6/2018 | Kasper | B62D 1/00 |
| 2018/0346029 A1 * | 12/2018 | Kabos | B60T 7/18 |
| 2019/0056492 A1 * | 2/2019 | Geiger | G01S 13/931 |
| 2019/0064835 A1 * | 2/2019 | Hoofard | B60D 1/246 |

FOREIGN PATENT DOCUMENTS

| | | | | |
|---|---|---|---|---|
| DE | 102005008874 A1 * | 9/2006 | ....... | G08G 1/096861 |
| DE | 102012003992 A1 * | 8/2013 | ......... | G06K 9/00812 |

* cited by examiner

*Primary Examiner* — Michael J Zanelli
(74) *Attorney, Agent, or Firm* — RowanTree Law Group, PLLC; Frederick F. Rosenberger

(57) ABSTRACT

A system can autonomously or semi-autonomously guide a driver to a dock or parking location. The system can include a sensor or sensors that collect data to create a map of the dock or parking location, a user interface that allows the driver to select a dock or a feature in the map and to determine the final pose of the tractor and trailer, and a planner that creates a kinematically-correct and obstacle-free trajectory from the current location to the dock or parking location. The system can provide user aids, such as a ground guide avatar or avatars, that provide the distance to the dock, speed and turning direction, or other guidance.

17 Claims, 4 Drawing Sheets

DRIVER AID AND AUTONOMOUS TRACTOR-TRAILER PARKING AND LOADING DOCK ALIGNMENT SYSTEM

CROSS REFERENCE TO RELATED PATENT APPLICATIONS

The present application claims priority from U.S. Patent Application No. 62/768,473, entitled "Driver Aid and Autonomous Tractor Trailer Parking and Loading Dock Alignment System", filed on Nov. 16, 2018. The benefit under 35 USC § 119(e) of the United States provisional application is hereby claimed, and the aforementioned application is hereby incorporated herein by reference.

STATEMENT REGARDING FEDERAL SPONSORSHIP

No part of this invention was a result of any federally sponsored research.

TECHNICAL FIELD OF THE INVENTION

The present invention relates in general to autonomous systems, and, more specifically, to a driver aid and autonomous tractor trailer parking and loading dock alignment system.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Backing up and aligning tractor trailers to a loading dock is one of the most complicated tasks performed by a truck driver. The kinematics of the vehicle, restricted visibility, and tight areas make this problem complicated, and often prone to accidents. These accidents can harm pedestrians and damage the tractor trailer, or other property. The burden of the costs of these accidents are shared by shipper and receiver, in the form of delayed deliveries, costs of insurance, repairs, injuries, and even loss of life.

The great majority of tractor trailers provide two different functions. They are either transporting goods from one warehouse to another (usually with an accessible loading bay/dock), or they are transporting goods between the warehouse and a customer delivery location. This "final destination" may be a building, or a single bay/dock, which is usually less organized and more unstructured than the warehouse. In both cases, there could be pedestrians and other obstacles in the way.

The present invention provides aids, and/or autonomy, to the driver in both conditions: the warehouse, and the less structured origin/destination. The invention is designed to aid the driver with facilities to simplify the parking and loading dock alignment process.

The invention controls the drive-by-wire system in the truck, controlling the steering, gearbox, acceleration, and brake, to automatically back up the truck into the desired location. This is possible if the truck is equipped with a drive-by-wire kit.

The invention controls one or more control signals to the drive-by-wire system while the driver controls the others. For example, the system provides feedback on the desired speed to the driver while automatically performing the steering that aligns the tractor trailer and the bay.

The invention provides feedback to the driver on the maneuver. In this case, the driver has control of all the functions of the truck. The invention provides guidance to the driver on each of these functions. For example, it can tell the driver a particular wheel position, a desired speed, etc. The invention has different communication mechanisms with the driver:

It can create a ground guide avatar, displayed in a screen or visor, that guides the driver using any traditional guiding signals used in the industry (arrows, palm-out hand signal for stop, etc.)

It can indicate, with a light or sound, the desired position of the driving wheel at each moment of time, and the desired speed or DIR gear.

BRIEF SUMMARY OF THE INVENTION

To minimize the limitations in the prior art, and to minimize other limitations that will be apparent upon reading and understanding the present specification, the present invention describes a driver aid and autonomous tractor trailer parking and loading dock alignment system.

These and other advantages and features of the present invention are described herein with specificity so as to make the present invention understandable to one of ordinary skill in the art, both with respect to how to practice the present invention and how to make the present invention.

DETAILED DESCRIPTION OF THE INVENTION

Figure 1:
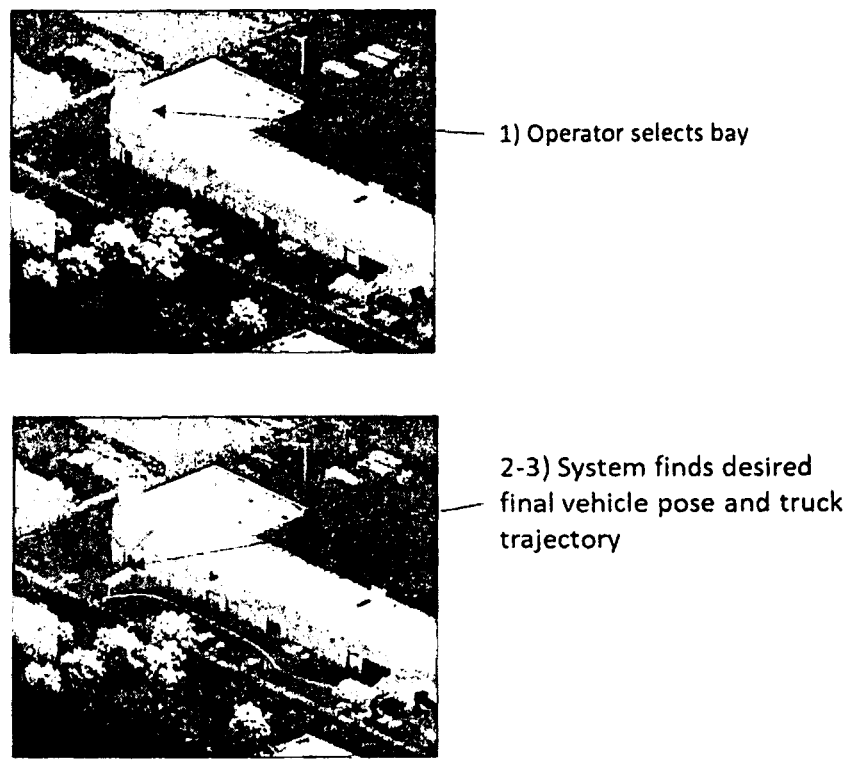
FIG. 1—Images showing that a truck needs to be loaded/unloaded at a certain bay at a warehouse.

The system facilitates the process using a set of steps: The system maps the area where the tractor trailer will ultimately park after the operation is finished, as well as the surroundings. This mapping can be performed with a LADAR, stereo pair, or other ranging sensors.

The operator selects a bay/loading area from the point cloud (or 3D model). The system can automatically find the center of that bay and find the perpendicular to that bay.

The system automatically computes a plan to move the tractor and trailer to that position, taking into consideration obstacles/pedestrians, and kinematics of the tractor and trailer.

Depending on if the truck is equipped with a drive-by-wire kit or not:

If the truck is equipped with drive-by-wire, the system will automatically perform the maneuver using the driver as a safety operator.

If the truck is not equipped with a drive-by-wire, the system will ask the operator to move the wheel to the right or left, providing visual and/or auditory feedback on the desired curvature. The driver will move the wheel, and press the accelerator and brake, to control the vehicle, and follow the system's real-time instructions.

The driver can also choose to control some of the drive-by-wire kit (i.e., accelerator and brake) and let the system control the others.

The system has three distinct phases:

Map generations. At this point, the map of the site is collected or obtained from Selection of docking pose. At this stage, the operator selects a desired final pose of the tractor and trailer.

Driving. This is performed autonomously through the drive-by-wire kit, or as an aid to the driver.

Docking. Docking is performed at the end of the maneuver as the vehicle comes to a stop at a defined distance from the dock.

As mentioned earlier, the map that allows the driver (or warehouse manager) to select the desired bay and/or desired direction, can be generated using a variety of sensors. With current technology, this map can be generated using LADARs, RADAR, stereo cameras, or structure-from-motion setups. The sensors can be mounted on the truck, covering the maneuver area in the warehouse parking/docking area, or a combination of both. The maps can be generated a priori and stored in the system (or transmitted by the warehouse to the truck), or they can be collected in real-time by the sensors. If the system is to be used to avoid moving entities (which is what it is preferred), some level of real-time mapping is necessary. These maps are created by the combination of one or more of the sensors presented above, and a localization unit (inertial, GPS or anchored beacon) can be used to accumulate sensor measurements over time, creating maps that extend pass the range and field-of-view of the sensors.

Because tractor trailers must often maneuver in alleys and areas that are not controlled or instrumented by an organized warehouse, the preferred configuration of the invention has the sensors mounted on the vehicle, and the maps are generated in real-time. If the warehouse has a sufficient number of trucks instrumented with the system, then it becomes cost effective to instrument some of the map generation sensors in the warehouse, or to use a combination of truck and warehouse-mounted sensors.

In particular, the maps have a number of important features. These features are used by the operator to select the bay/docking area or direction, and by the autonomous system to find the trajectories that avoid obstacles and move the trailer to a desired location. In addition, if the maps contain moving entities, the map can label those entities as dynamic obstacles.

Localization is performed with a variety of choices: inertial, GPS/DGPS, localization beacons anchored to the site, visual/LADAR odometry, or wheel odometry. Because the distance is relatively small between when the maps are generated and the final resting pose, the localization problem is relatively simple, and it can be accomplished with any of (or a combination of) the methods presented above. In particular, because the speeds are slow in these events, and the surfaces are not likely to be very slippery, inertial/wheel odometry provides a simple and inexpensive localization method. Since the final selected by the operator is sensed by the onboard sensors, the localization errors are corrected by correlating with the stationary feature.

The operator must tell the system the final resting position of the tractor and trailer (parked position). To be clear, the operator does not need to be in the truck for this system, although for most implementations this will be the case.

Several choices are provided as part of the interface: If this docking location is a warehouse, a map can be provided by the installation that shows the location of each bay, and the pose of the vehicles at each bay. In this case, the interface allows the operator to select a bay. This a priori map of the facility can be provided in advance or can be downloaded by the truck as it enters the facility. The map contains the location of each bay, permanents obstacles (telephone poles), off-limits areas, directionality of travel, etc.

If the a priori map of the site is not available, the interface allows the operator to select different areas in the map by providing a touchscreen or monitor-and-pointer configuration. The operator can choose to select walls from the map, or other features (lines, fences, etc.), and select a direction that uses that feature. For example, the driver can select a point perpendicular to a wall at a certain location, or parallel to another feature aligning with the front or the back of the tractor trailer.

A facility is provided in the system to automatically find the bays. The bays look like small or large indentations on the walls of certain size. By filtering the point cloud, the bays can be easily extracted from the point cloud and provided to the operator as features against which they can align.

The operator can choose to align the tractor and trailer (or under certain circumstances, choose to have them parked) where the trailer and tractor are purposely parked at an offset angle with respect to each other. The interface allows the operator to make this selection.

At the end of this process, the system has a desired ending pose for the tractor and trailer. Moreover, given the current pose of the tractor and trailer, the system can compute the pose change to be required by the system.

Given the starting pose defined by the current location of the tractor and trailer, and the desired pose provided by the operator using the user interface and the map (real-time and/or a-priori), a planner is used to create an obstacle free trajectory that takes the tractor-trailer from the current pose to the desired pose. There are several algorithms in the literature that can perform this task. The space of search is limited to 3-6 degrees of freedom, depending on assumptions about the terrain. Dynamic programming/A* is currently used on our implementation of the system; however, other algorithms can be used. One such algorithm is the Rapidly exploring Random Tree (RRT) algorithm that has been used in the past for complex kinematic problems, like the one presented here. Also, genetic algorithms can provide quasi-optimal results in real-time. There are many path optimization trajectory generators that can be used for this application, as the degrees of freedom are relatively low, and the space of search is short, as the maneuvers are likely to be less than 100 m in length.

The image shows the maneuvers of the tractor-trailer (trajectory) when encountered with a random obstacle field.

Although planning can be performed once, the invention can be made to re-plan at regular intervals. This is helpful as errors in sensing, path-following, and localization can accumulate, and the original plans may no longer be valid.

In a more complex yard, where other vehicles in the yard are moving, each vehicle can provide their planned trajectories. The planner for the tractor can use the trajectories in x, y time of other vehicles to block off areas that it should not traverse at a particular time. These constraints are easily handled by the above presented planner, if the space of search includes the time dimension.

Some yards create queues to tractor trailers to prioritize the bays and wait until the bays become available. In this case, the operator is capable of assigning a sequence of desired poses rather than a single one.

Once the trajectory has been found, the operator needs to decide how the maneuver is going to be executed. If the truck is equipped with a drive-by-wire kit, the system can execute the path, as created by the planner, by sending speed and steering commands to the drive-by-wire kit. This is performed by using Pure Pursuit or Vector Pursuit algorithms on the trajectory. As the system replans, errors in sensing localization and moving obstacles are accounted for. The Driver executor verifies that the trajectory is obstacle free and applies the brakes until the planner has re-planned a route, or the moving obstacle is no longer on the way.

If the driver decides not to use the drive-by-wire kit, or the truck is not equipped with one, he can choose to either partially control the vehicle or fully control the vehicle. For these instances, the invention provides instructions on how to perform the maneuver to the operator on a step-by-step basis. In particular, the invention can indicate what wheel position the driver needs to move the wheel to, at each moment of time. A second aid provides instructions using a help avatar, which is familiar to most drivers. In this case, the avatar displayed on the interface uses standard hand ground, or other standard direction signals. There are several standards in different countries for these hand signals, and the invention can implement different sets depending on the location or the preference of the driver.

The avatar can also display speed signals, distance signals, and direction signals showing the driver when to turn, change directions, or stop.

Docking is a special case of the driving state. In this case, if the avatar is being used, the avatar will show the operator the distance to the dock. This distance is easily measured by the onboard sensors.

If the drive-by-wire system is being used, the system can stop at the distance measured by the sensor or can slowly back up until the trailer taps the rubber cushions setup at the dock. The operator gets to choose the details of the docking modality.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. Note with respect to the materials of construction, it is not desired nor intended to thereby unnecessarily limit the present invention by reason of such disclosure.

Figure 4:
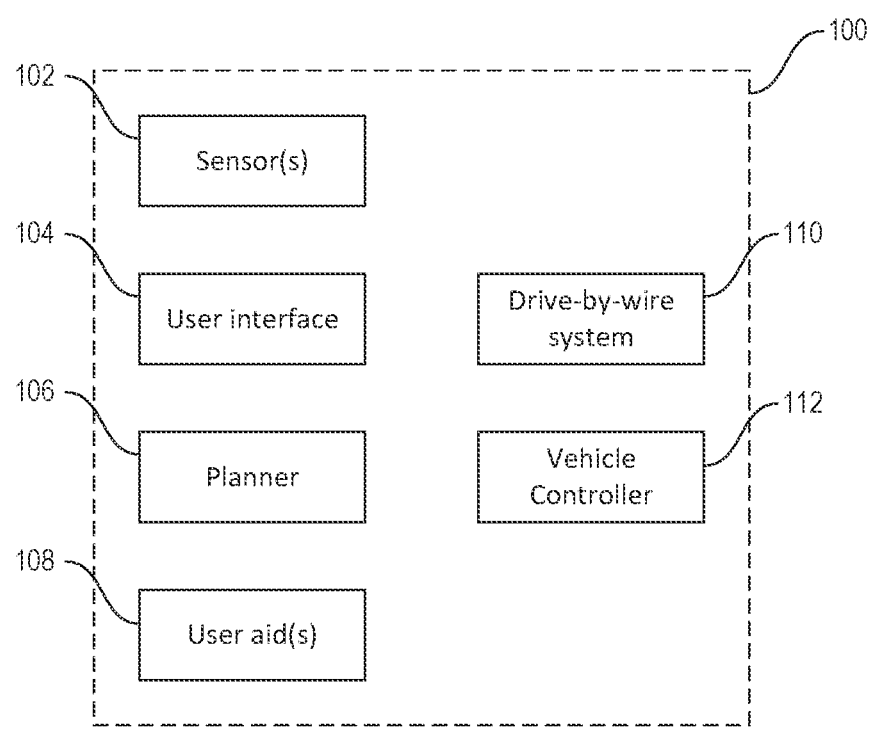
FIG. 4—Illustration of a system designed to autonomously or semi-autonomously guide a driver to a dock or parking location.

The present invention involves the development of a system 100 (as shown in FIG. 4) designed to autonomously or semi-autonomously guide a driver to a dock or parking location that comprises a sensor or sensors 102 that collect a map of the dock or desired parking area, a user interface 104 that allows the operator to select a dock, or a feature in the map and determine the final pose of the tractor and trailer, a planner 106 that creates a kinematically correct and obstacle free trajectory from the current location to the desired location and a set of user aids 108, including a ground guide avatar or avatars that provide the distance to the dock, speed, and turning direction, or other guidance.

Kinematics refer to the branch of mechanics that studies the motion of a body or a system of bodies without consideration given to its mass or the forces acting on it. As a result, a kinematically correct trajectory would involve the development of a trajectory that does not consider the mass or the forces acting on it.

In this system, the ground guide avatars are enhanced or replaced by wheel position indicators, lights, or auditory feedback. There is also a drive-by-wire system 110 and a vehicle controller 112 that commands the drive-by-wire steering, gears, brake, and acceleration commands. A drive-by-system is use of electrical or electro-mechanical systems for performing vehicle functions traditionally achieved by mechanical linkages. The map is created by a combination of sensed information and information about the site provided in by the yard/external communication or stored on the vehicle.

In this system, the planner replans as the maneuver is being executed to account for moving obstacles. The system uses a LADAR, stereo camera, optical flow, RADAR, or other type of ranging sensor to create the map. These sensor(s) are mounted on the tractor, the trailer, the yard, or a combination of these locations. LADAR refers to Light Detection and Ranging and is a surveying method that measures distance to a target by illuminating the target with pulsed laser light and measuring the reflected pulses with a sensor. Differences in laser return times and wavelengths can then be used to make digital 3-D representations of the target. A stereo camera is a type of camera with two or more lenses with a separate image sensor or film frame for each lens. This allows the camera to simulate human binocular vision, and therefore gives it the ability to capture three-dimensional images, a process known as stereo photography. Optical flow is a pattern of apparent motion of objects, surfaces, and edges in a visual scene caused by the relative motion between an observer and a scene. Optical flow can also be defined as the distribution of apparent velocities of movement of brightness pattern in an image. An optical flow sensor is a vision sensor capable of measuring optical flow or visual motion and outputting a measurement based on optical flow. Various configurations of optical flow sensors exist such as an image sensor chip connected to a processor programmed to run an optical flow algorithm and a vision chip which is an integrated circuit having both the image sensor and the processor on the same die, allowing for a compact implementation. RADAR refers to Radio Detection and Ranging and is a detection system that uses radio waves to determine the range, angle, or velocity of objects. It can be used to detect aircraft, ships, spacecraft, guided missiles, motor vehicles, weather formations, and terrain. Ranging sensors are devices that capture the three-dimensional (3-D) structure of the world from the viewpoint of the sensor, usually measuring the depth to the nearest surfaces. These measurements could be at a single point, across a scanning plane, or a full image with depth measurements at every point.

In this system, the sensors are mounted on the tractor's rear-view mirrors and the operator controls the acceleration and brake, and the system controls steering. The yard has a set of preferred maneuvers for each loading dock. Also, the system remembers the maneuver performed by the operator at a previous time. The system automatically tells the operator if a moving obstacle is approaching in the proposed trajectory.

One or more vehicles in the yard share their location and future trajectories, and these trajectories are used by the planner to eliminate combinations that will collide with other moving vehicles. The operator, yard, or warehouse selects the desired bay or parking location. The tractor trailer is guided through a series of poses so as to be able to queue or wait until the bays become free. A special docking maneuver is performed by allowing the trailer to slowly move backwards until the rubber bumpers are hit. The system automatically detects the "collision" with the bumper and stops the system.

the present invention describes a system that is designed to autonomously or semi-autonomously guide a driver to a dock or parking location. It comprises a sensor or sensors that collect a map of the dock or desired parking area, a user interface that allows the operator to select a dock, or a feature in the map and determine the final pose of the tractor and trailer, a planner that creates a cinematically correct and obstacle free trajectory from the current location to the desired location and a set of user aids including a ground guide avatar or avatars that provide the distance to the dock, speed, and turning directions, or other guidelines.

In this system that has been developed, the avatars are enhanced or replaced by wheel position indicators, lights, or auditory feedback.

The system that is described is further comprised of a drive-by-wire system and a vehicle controller that commands the drive-by-wire steering, gears, brake, and acceleration commands. The map is created by a combination of sensed information and information about the site provided in by the yard/external communication or stored on the vehicle.

The system that is described has a planner that replans as the maneuver is being executed to account for moving obstacles. The system uses a LADAR, stereo camera, optical flow, RADAR, or other type of ranging sensor to create the map. These sensor/sensors are mounted on the tractor, the trailer, the yard, or a combination of these locations.

Light Detection and Ranging (LADAR) refers to a surveying method that measures distance to a target by illuminating the target with laser light and measuring the reflected light with a sensor.

A stereo camera is a type of camera with two or more lenses with a separate image sensor or film frame for each lens. This allows the camera to simulate human binocular vision, and therefore gives it the ability to capture three-dimensional images, a process known as stereo photography.

Optical flow refers to the pattern of apparent motion of objects, surfaces, and edges in a visual scene caused by the relative motion between an observer and a scene. Optical flow can also be defined as the distribution of apparent velocities of movement of brightness pattern in an image.

Radio Detection and Ranging (RADAR) refers to a detection system that uses radio waves to determine the range, angle, or velocity of objects. It can be used to detect aircraft, ships, spacecraft, guided missiles, motor vehicles, weather formations, and terrain.

FIG. 1 shows that a truck needs to be loaded/unloaded at a certain bay at a warehouse. The operator selects the desired bay on the display. The system computes a safe trajectory, including turns, and backups, that maneuvers the truck from its initial pose to its final pose. A pose is the position of the vehicle including translation, orientation, and trailer hitch angle.

Figure 2:
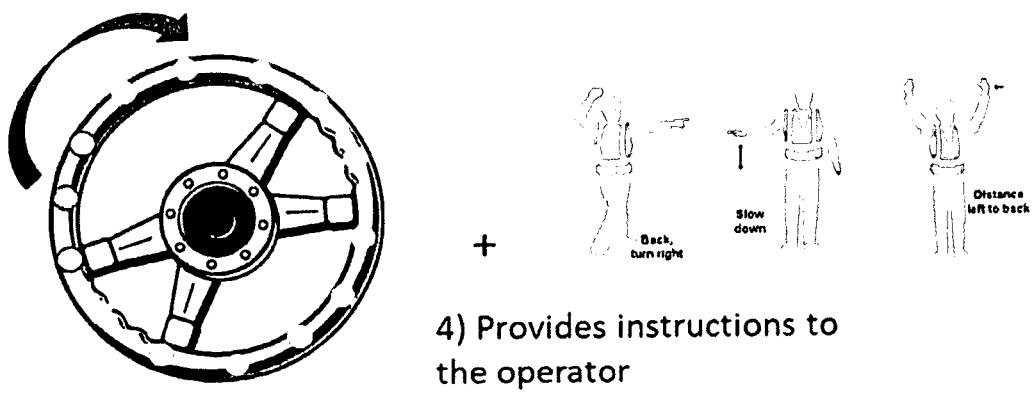
FIG. 2—Illustration in which the system provides instructions to the driver that help the driver position the truck at the correct pose at the selected bay.

FIG. 2 shows the system providing driving instructions tot eh driver. These instructions help the driver position the truck at the correct pose at the selected bay. They include turn and speed commands. Different methods could be used such as lights on the steering wheel that indicate which way to steer and by how much. They could be icons that represent a ground guide giving turn commands, speed commands, and distance remaining commands.

Figure 3:
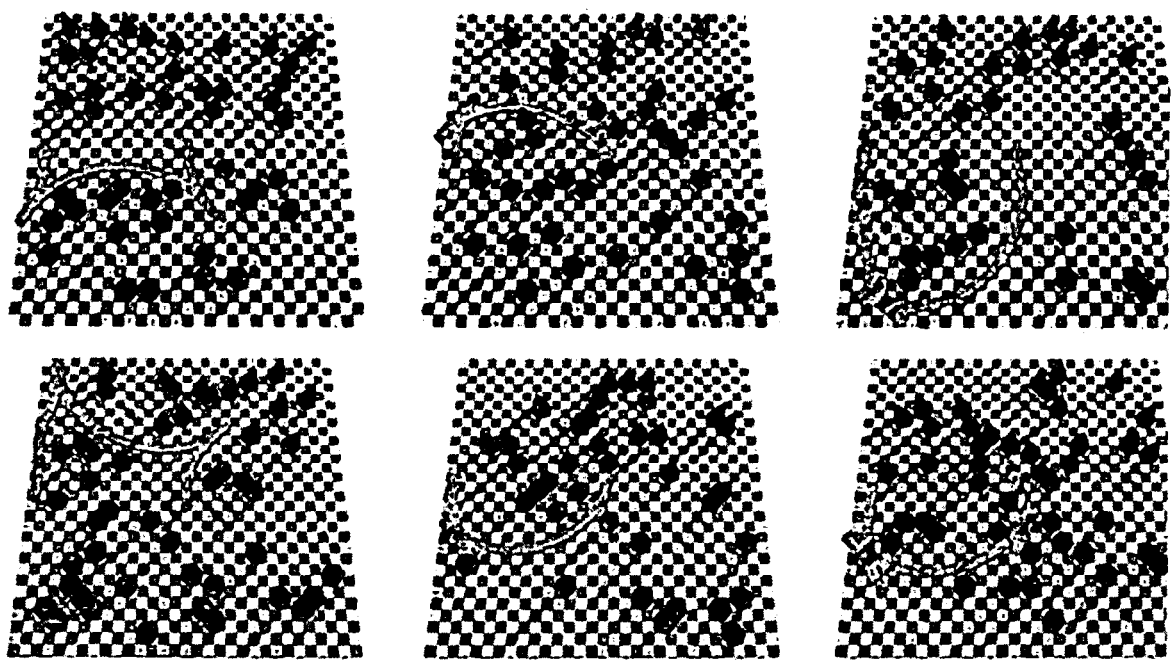
FIG. 3—Images showing the output of a trajectory planner for six different obstacle sets.

FIG. 3 shows a display of the planner in which the output of a trajectory planner for six different obstacle sets are shown. The area is shown as an orange and yellow checkered pattern. Obstacles are the blue cones. The resulting trajectory is the grayish squiggle. In each case, the vehicle starts in the center of the map facing to the top of the map and has to maneuver to a point at the left of the map facing downward. For different sets of obstacles, different maneuvers are computed.

The embodiments of the invention in which an exclusive property or privilege is claimed are defined as follows:

1. A system designed to autonomously or semi-autonomously guide a driver to a desired dock or parking location, comprising:
   a sensor or sensors that collect data to create a map of the desired dock or parking location;
   a user interface that allows the driver to select a dock or a feature in the map and to determine a final pose of a tractor and trailer;
   a planner that creates a kinematically-correct and obstacle-free trajectory from a current location to the desired dock or parking location; and
   a set of user aids, including a ground guide avatar or avatars, that provide the distance to the dock, speed and turning directions, or other guidance.

2. The system of claim 1, wherein the avatars are enhanced or the set of user aids includes wheel position indicators, lights, or auditory feedback.

3. The system of claim 1, further comprising a drive-by-wire system and a vehicle controller that provides steering, gears, brake, and acceleration commands to the drive-by-wire system.

4. The system of claim 1, wherein the system is configured to create the map by combining sensed information and (a) site information provided by a yard in which the tractor is located, (b) site information communicated to the tractor from an external source, or (c) site information stored in the tractor.

5. The system of claim 1, wherein the planner is configured to re-plan the trajectory as the created trajectory is being executed to account for moving obstacles.

6. The system of claim 1, where the sensor or sensors comprise a light detection and ranging (LADAR) device, a stereo camera, an optical flow sensor, a radio detection and ranging (RADAR) device, or another type of ranging sensor.

7. The system of claim 6, wherein the sensor or sensors are mounted on the tractor, on the trailer, in a yard, or a combination of these locations.

8. The system of claim 1, wherein the sensor or sensors are mounted on one or more rearview mirrors of the tractor.

9. The system of claim 1, wherein the system is configured to control steering while the driver manually controls acceleration and braking.

10. The system of claim 1, wherein the planner is configured to receive a set of preferred maneuvers for each dock.

11. The system of claim 1, wherein the planner is configured to store a maneuver performed by the driver at a previous time.

12. The system of claim 1, wherein the system is configured to alert the driver if a moving obstacle is approaching in the trajectory created by the planner.

13. The system of claim 1, wherein:
the system is configured to receive information regarding location and future trajectories from one or more vehicles, and
the planner is configured to use the received information to eliminate trajectory options that will collide with the one or more vehicles.

14. The system of claim 1, wherein the system is configured to receive selection, by a driver, a yard, or a warehouse, of the desired dock or parking location.

15. The system of claim 1, wherein the tractor or the trailer is guided through a series of poses, so as to be able to queue or wait until the desired dock or parking location becomes free.

16. The system of claim 1, wherein the system is configured to perform a special docking maneuver by allowing the trailer to slowly move backwards until collision with rubber bumpers.

17. The system of claim 16, wherein the system is further configured to automatically stop movement of the trailer responsive to detection of the collision.

* * * * *